May 5, 1970   P. E. DEPLANTE   3,509,963
PROCESS AND MATERIAL FOR SOUND PROOFING VEHICLES
Filed April 10, 1967   2 Sheets-Sheet 1

May 5, 1970   P. E. DEPLANTE   3,509,963
PROCESS AND MATERIAL FOR SOUND PROOFING VEHICLES
Filed April 10, 1967   2 Sheets-Sheet 2

Inventor
Paul Deplante
By Cushman, Darby & Cushman
Attorneys

United States Patent Office 3,509,963
Patented May 5, 1970

3,509,963
PROCESS AND MATERIAL FOR SOUND PROOFING VEHICLES
Paul E. Deplante, Bordeaux-Cauderan, France, assignor to Avions Marcel Dassault, Saint-Cloud, Hauts-de-Seine, France
Filed Apr. 10, 1967, Ser. No. 629,719
Claims priority, application France, Apr. 29, 1966, 58,116
Int. Cl. E04b 1/86; B32b 7/00
U.S. Cl. 181—33                    17 Claims

ABSTRACT OF THE DISCLOSURE

The present invention has for its main object a new method and system for reducing the acoustic penetration of a wall and, in particular, of the metallic or plastics wall of a conveyance having on its interior face (that is, the face remote from the main source of noise) a juxtaposed arrangement of equal or unequal panels bounded by the frame members of the body structure of said conveyance.

This method and system also makes possible the reduction of noise-propagation through the structure whereby a mechanical vibration transmitted to some point in the structure spreads along the entire length thereof, and, during its passage, vibrates all the panels of the covering that it encounters.

The invention has for another of its objects a general method and system of reducing transmission of noise through a composite wall.

BACKGROUND OF THE INVENTION

Designers of conveyances having metallic or plastic bodies, whether such conveyances be aircraft, space cabins, automobiles or railway carriages, have to face very complex noise-reduction problems in order that the noise level inside such an enclosure does not rise above the normal.

Whether the noise originates outside the conveyance or inside it, these designers have to resolve the problem of reducing the direct transmission of noise due to the mechanical vibrations of the exterior covering. This problem involves propagation of vibrations by the structure and in absorption of the noise originating in, or spreading to, the interior of these enclosures.

SUMMARY OF THE INVENTION

The main object of the invention is to provide a system of reducing the acoustic penetration of the wall, and, in particular, of the metallic or plastic wall of a conveyance having on its interior face (that is, the face remote from the main source of noise) a juxtaposed arrangement of equal or unequal panels bounded by the frame members of the body structure of said conveyance, characterized in that there is fixed on the interior of each panel at least one tablet of a material suitable for reducing the sound waves by damping them out, the area of said tablet being appreciably smaller than that of the corresponding panel.

The wall-portion constituting each panel, excited by the turbulent flow of the outside air, the vibrations of the structure and the exhaust noises, behaves like the diaphragm of a loud-speaker.

According to one feature of the invention, each tablet is made of a material which undergoes plastic deformation at the temperatures reached when the conveyance is travelling (which temperatures may fall to several tens of degrees below zero centigrade in the case of aircraft and space cabins).

According to one embodiment, this material may be, for example, a viscous mass of a polyolefin derivative, e.g., a mixture of polyisobutylene and an inert filler material.

According to another feature of the invention, each tablet fixed to said face is protected by means of an adhesive film covering only part of said tablet or, at least, being perforated to a sufficient extent to prevent the formation of microscopic areas in which air and condensate are trapped.

In respect of the damping out of the transverse waves, the tablets merely act upon the panels.

The tablets play a second part, collectively rather than individually, as regards the reduction of noise-propagation through the structure, whereby a mechanical vibration, transmitted to some point in the structure, spreads along the entire length thereof and, during its passage, excites all the panels of the covering that it encounters.

In effect, the wall may be considered as being formed, in its longitudinal direction, of "coupled lines," the portion of the wall contained within two adjacent lines constituting a band with said lines.

According to a further feature of the invention, each band contains a row of tablets, one to each panel, the arrangement being such as to provide a low-pass filter which has a cut-in frequency beyond which propagation through the structure is much reduced (the amplitude of the vibrations of frequencies higher than the cut-in frequency diminishing rapidly).

According to a preferred form of the invention, the general method of reducing the transmission of sound through a composite wall of a conveyance in which the above-stated system and the above-specified means are also used, is characterized by the following arrangements: behind this exterior covering, fitted with said tablets, there are placed in succession a sheet of acoustically absorbent, impedance-adapting material, a layer of a barrier material, a plate for supporting the decorative material extending over the entire interior surface of the wall, a layer of an absorbent, anti-reflecting material, and, if required, a perforated decorative material.

It is well known that on the emission-side surface (exterior side) the impedance must be as close as possible to that of air, since in the contrary case, the structure would be "impermeable," that is to say of the membrane type, and would follow the mass law:

$$\text{Reduction} = 20 \log \frac{\omega m}{\rho c}$$

in which:

$\omega$ = pulsation at frequency F
$m$ = mass of the material
$\rho$ = voluminal mass of the air
$c$ = rate of propagation of sound pulses in the air.

This formula shows that an increase in mass acts only as a function of its logarithm, hence there is only a very slight gain.

On the other hand, in the case under consideration, a good idea of the phenomenon of progressive damping or braking may be given by the formula for the rate of propagation of sound in a capillary tube, namely:

$$V' = \frac{V}{2} \frac{a}{\sqrt{\frac{\mu v}{\rho \omega}}}$$

which formula is valid if the frequency is not too high and in which:

V'=rate of propagation in a capillary tube of a radius $a$,
V=rate of propagation through the air,
$a$=radius of the tube,
$\mu$=coefficient of viscosity,
$\rho$=voluminal mass of the air,
$\gamma$=ratio of the specific temperatures of the air at constant pressure and volume,
$\omega$=pulsation of frequency F.

In the case of higher frequencies, and taking into account the heat exchanges with the walls, the preceding formula becomes:

$$V' = V \left[ 1 - \frac{1}{2a} \left( 1 + \left( \sqrt{\gamma} - \frac{1}{\sqrt{\gamma}} \right) \sqrt{\frac{K}{\rho c \mu}} \right] \sqrt{\frac{2\mu}{\rho \omega}}$$

It will be observed that if $a$ decreases progressively, V' decreases in the same manner, and it follows that the theoretically ideal material should be perforated with a very large number of capillary cones, the tangent bases of which would be directed towards the source of the sound.

Such a structure of progressive surface density enables acoustic impedance to be accommodated at the outset without any shock effect of the membrane type.

Next, in accordance with the laws governing the flow of fluids in capillary tubes, there is progressive "braking" due to the diminution of the sectional area (viscosity phenomenon).

The damping is thus more particularly a function of the viscosity and of the non-reversible energy exchanges between the air and the walls. (Conversion of mechanical energy into thermal energy).

According to one feature of the invention, such a material is obtained by superposing several layers of material of different homogeneous densities, so arranged that the least dense layer is nearest to the source of the noise.

In one method of carrying this into practice, such material is provided by superposing several fibrous layers so arranged that the least dense layer is nearest to the source of the noise, and in particular by superposing several layers of glass-wool, the layer nearest the outside wall having approximately $9.3 \times 10^5$ perforations (per unit surface) of a mean area of $1.7 \times 10^{-6}$, the innermost layer having approximately $8.4 \times 10^6$ perforations having an average area of $1.18 \times 10^{-7}$.

It is well known that in solids the sound is propagated because of the elastic deformations and for this reason, in accordance with one of the features of the invention, the barrier material is placed immediately behind the noise-reduction, impedance - accommodating complex takes the form of a plastically deformably material.

In one embodiment, this barrier material is a plasticized elastomer of the micro-cellular expansion type.

If used alone in thin strips in direct contact with the air, that is without adaptation, it would behave as a vibration-producing membrane. It would, of course, be possible to avoid this effect by increasing the thickness, but this would become prohibitive.

To come within acceptable limitations, the invention combines the use of this plastically deformably material with impedance accommodators taking the form of the absorbent materials specified above.

The impedance increases continuously from the emission-side surface where it is very small, to the inside surface where it is great and close to that of the surface of the barrier material. The residual energy of the incident wave is largely absorbed within the material in the form of thermal energy.

It is well known that the interior coverings of compartments within conveyances can be the cause of increases in the level of interior noise rising to 10 decibels because of the setting up of a complex system of stationary waves due to the high reflective capacity of these coverings.

One feature of the invention therefore is to provide an absorbent complex having very wide effective bands, but having a very high coefficient in the speech-frequency range.

According to a feature of the invention, this absorbent complex is glued to the inside face of strips of appropriate form, resiliently suspended from the structural members in such a way that this suspension, the inherent pitch of which is outside the audible band, insulates said complex from the structural vibrations.

According to another feature of the invention, this absorbent complex is provided by the combination of a decorative-supporting sheet made of an agglomerated material of the balsa type covered on both faces with a film of polyester, and of a sheet of non-reflecting resonant material made up by superposing two cellular layers, the one placed against the support panel containing a plurality of cavities, the other being uninterrupted and sealing said cavities on the outside face.

To retain all the advantages of this complex, the inside decorative material applied to the cellular layers is a perforated fabric which is glued on without obstructing the surface cells.

Other features and advantages of the invention will be apparent from the following description which refers to the accompanying drawings given by way of example only of the invention.

Figure 1:
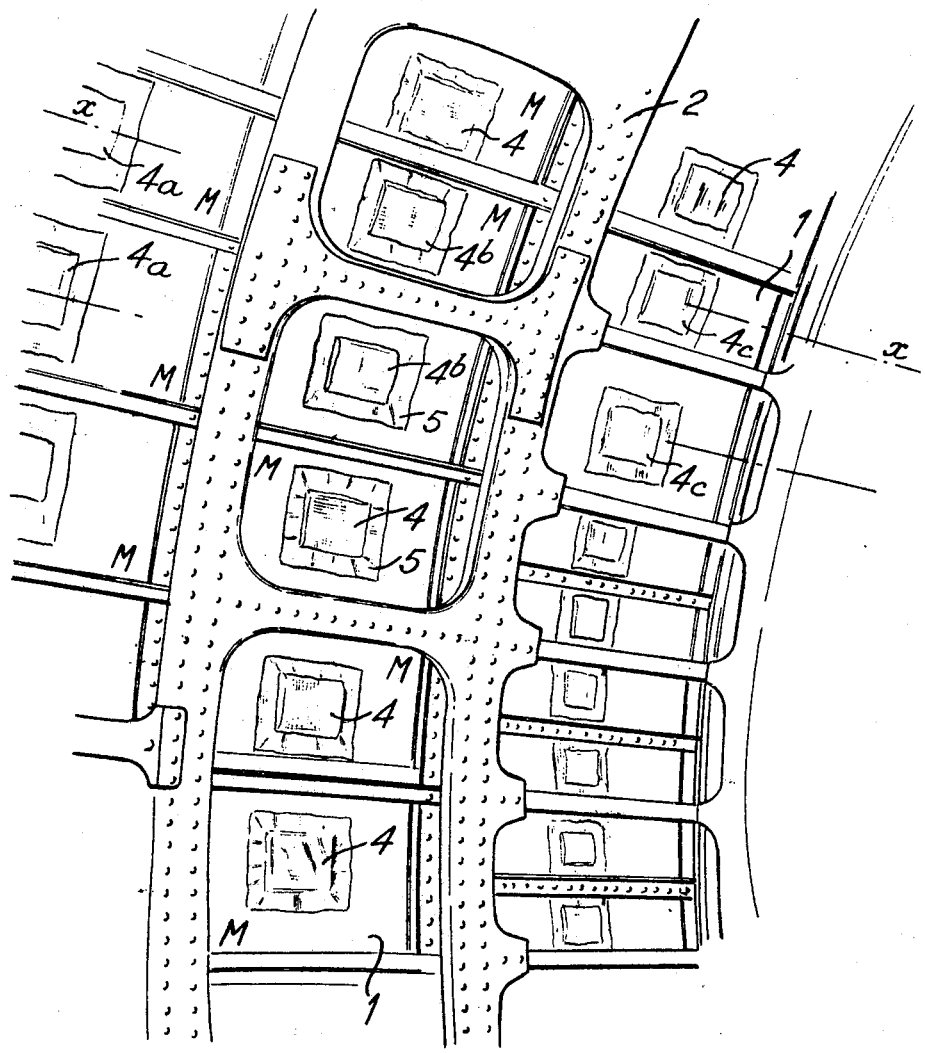
FIG. 1 is a perspective fragmentary view of an aircraft fuselage seen from the inside, the inner noise-reduction complex and the decorative elements having been removed.

As can be seen from FIG. 1, the fuselage of an aircraft comprises an exterior wall 1 usually made of metal, and fixed on a structure comprising frame members projecting from the inner face of this wall. As shown in FIG. 1, there are two frame members dividing the outside wall into a number of equal or unequal panels M arranged in longitudinal rows or bands.

According to the invention, in the middle of each panel there is fixed a viscous mass in the form of a tablet 4 protected by a perforated adhesive strip 5. Where the metal sheet forming the outside wall has a thickness of 0.6 to 1.2 mm. and the panels are 100/150 mm. wide and 150/300 mm. long, the dimensions of the tablets are about ¼ of the length, ⅓ of the width of the panel and five times the thickness of the sheet metal.

The tablets $4a$, $4b$, $4c$, etc., of one and the same row (for example $x$—$x$) behave with respect to the wall 1 as a low-pass filter the cut-in frequency of which is given by the approximate formula:

$$F_0 = \frac{1}{2\pi} \sqrt{\frac{12E1}{L3 \left( M + \frac{33}{140} m \right)}}$$

It is important to keep $F_0$ as low as possible since, in the case of propagated frequencies lower than $F_0$, stationary waves are set up and reduction of propagation through the structure of the wall is poor.

Each tablet is made from a material which undergoes plastic deformation at the temperatures reached when the aircraft is travelling (which temperatures may fall to several tens of degrees below zero centigrade in the case of aircraft and space cabins). The material may, for example, be a viscous mass. Suitable materials are polyolefin derivatives, for example a mixture of polyisobutylene and an inert filler material.

Figure 2:
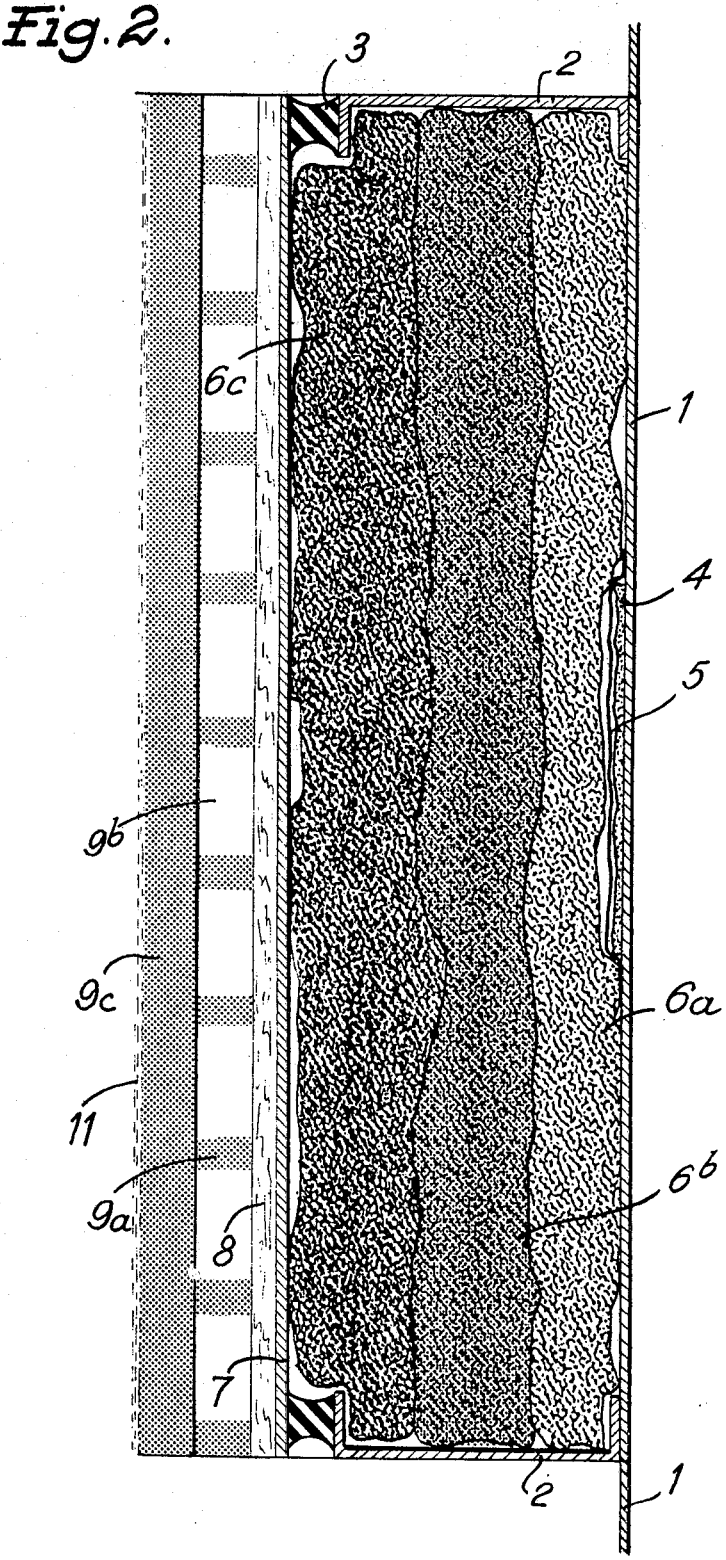
FIG. 2 is a section through a composite wall according to the present invention.

As can be seen from FIG. 2, behind this wall 1 provided with the tablets 4, there are placed successively, a sheet 6 of an absorbent impedance-accommodating material, a layer 7 of barrier material, a support sheet 8 extending over the entire inside surface of the compartment, and two layers 9a–9c of an absorbent non-reflecting material covered by a perforated decorative material such as a fabric 11. The layer of impedance-accommodating material is formed by three sheets of glass-fibres, the sheet 6a being made in such a way that it contains $9.3 \times 10^5$ perforations having an average area of $1.7 \times 10^{-6}$, the sheet 6b having $1.16 \times 10^6$ perforations (per unit of area) of an average area of $7.4 \times 10^{-7}$ and the layer 6c containing again per unit of area, $8.4 \times 10^6$ perforations of an average area of $1.18 \times 10^{-7}$. These values are statistical and can be compared to mean values.

As will be seen from FIG. 2, the layer 6c projects substantially beyond the flange of the frame member or post 2 and extends as far as the layer of barrier material 7.

The barrier material 7 is a plasticized chloroprene elastomer of the controlled micro-cellular expansion type. It is supported on the frame members such as the posts 2 by lugs 3 made of an anti-vibratory material. Glued to this barrier material is support sheet 8, made for example of laminated balsa, contained within two films of a polyester. It is this support which retains the layer of anti-reflecting material. The latter comprises a sheet 9a of foam polyurethane (density 40 kg./m.$^3$), perforated to the extent of 50% by cavities 9b having a diameter of about 20 mm., and also another layer 9c of foam elastic material which is not perforated and which consequently seals the cavities 9b.

Finally, to satisfy aesthetic needs, the whole is covered with a ventilated fabric the fine perforations of which are invisible but permit ready passage therethrough of sound waves, so that they may be absorbed by the layers 9a and 9c.

Without departing from the ambit of the present invention, the embodiments that have been described can be modified very considerably. Thus the subject-matter of the present invention may be combined with that of the French patent filed by Societe General Aeronautique Marcel Dassault on June 28, 1963 with the title "Sound Proofing Installation for Aircraft Compartments" and granted under the number 1,368,974. The particular object of such a combination is to reduce the residual level of serious noise, the resonator according to this patent being tuned to the basic frequencies of the jets and the fuselage (frequencies lower than 200 cycles).

I claim:

1. System for reducing the acoustic penetration of a conveyance having a body structure and a metallic or plastics outside wall, comprising an interior face remote from the main source of noise, frame members of said body structure, a juxtaposed arrangement of panels on said interior face, said panels being defined by said frame members, one and only one tablet fixed to the inside of each panel, of an area appreciably smaller than the corresponding panel, the material of the tablet undergoing plastic deformation at the temperature reached when the conveyance is travelling, said tablet being free of any rigid reinforcing structure within the body of the tablet and partially covered with a perforated adhesive film.

2. System according to claim 1, comprising a tablet of a material which is a viscous mass of a polyolefin derivative.

3. System according to claim 2, wherein said viscous mass is a mixture of polyisobutylene and an inert filler material.

4. System according to claim 1, comprising a metallic outside wall having a thickness of 0.6 to 1.2 mm., panels of a width of $^{100}/_{150}$ mm. and a length of $^{150}/_{300}$ mm., the dimensions of the tablets being ¼ of the length and ⅓ of the width of a panel and five times the thickness of the metallic outside wall.

5. System according to claim 4 wherein each of said tablets consists wholly of said plastic material, the surface of each tablet on the side facing away from its respective panel being substantially completely free of any attached cover layer.

6. System according to claim 1, comprising tablets arranged in lines in the longitudinal direction, to provide a low-pass filter having a cut-in frequency beyond which noise-propagation through the structure is greatly reduced.

7. System for reducing the acoustic penetration of a conveyance having a body structure and a metallic or plastics outer wall having an interior face remote from the main source of noise, said system comprising: spaced-apart frame members associated with said interior face and dividing the latter into a plurality of panels; one and only one tablet fixed to the inside surface of each panel, the tablet having an area appreciably smaller than the corresponding panel, the material of the tablet undergoing plastic deformation at the temperature reached when the conveyance is travelling, said tablet being free of any rigid reinforcing structure within the body of the tablet; and further comprising the following features; acoustically absorbent impedance-accommodating material placed behind the outside wall provided with a tablet, a layer of a barrier material placed over said acoustically absorbent impedance-accommodating material, and a layer of absorbent nonreflecting material over said barrier material.

8. System according to claim 7 wherein the acoustically absorbent impedance-accommodating material is a material having a surface density increasing from the outside to the inside.

9. System according to claim 8 wherein said material comprises superposed layers of material of different homogenous densities with the least dense layer arranged nearest to the source of noise.

10. System according to claim 9, wherein said material comprises superposed fibrous layers with the least dense layer nearest to the source of noise.

11. System according to claim 10, comprising a layer of glass-wool nearest to the outside wall having approximately $9.3 \times 10^5$ perforations (per unit of area) and an average area of $1.7 \times 10^{-6}$, and an innermost layer of glass wool having approximately $8.4 \times 10^6$ perforations (per unit of area) and an average area of $1.18 \times 10^{-7}$.

12. System according to claim 7, comprising a barrier material of plastically deformable material.

13. System according to claim 12, wherein a barrier material is a plasticized elastomer of the micro-cellular expansion type.

14. System as claimed in claim 7, comprising a support sheet, said support sheet separating the barrier material from the absorbent non-reflecting material.

15. System as claimed in claim 14, comprising two superposed cellular sheets forming the layer of absorbent non-reflecting material, a first sheet having a plurality of cavities and being placed against the support sheet and a second uninterrupted sheet sealing said cavities.

16. System according to claim 14, comprising a support sheet made of an agglomerated material of the balsa type covered on both its faces with a film of polyester.

17. System as claimed in claim 7 and further comprising a perforated decorative material over said absorbent non-reflecting material.

References Cited

UNITED STATES PATENTS

| | | |
|---|---|---|
| 1,914,912 | 6/1933 | Dunford. |
| 2,090,459 | 8/1937 | Paton. |
| 2,196,615 | 4/1940 | Surprenant. |

(Other references on following page)

| | | |
|---|---|---|
| 2,586,275 | 2/1952 | Toulmin _____ 161—159 |
| 2,819,032 | 1/1958 | Detrie et al. |
| 3,056,707 | 10/1962 | Helbing et al. |
| 3,061,491 | 10/1962 | Sherrard et al. |
| 3,071,217 | 1/1963 | Gould. |
| 3,111,188 | 11/1963 | Rees et al. |

FOREIGN PATENTS

| | | |
|---|---|---|
| 462,129 | 3/1937 | Great Britain. |
| 513,171 | 10/1939 | Great Britain. |
| 872,519 | 7/1961 | Great Britain. |
| 1,052,865 | 12/1966 | Great Britain. |

ROBERT S. WARD, Jr. Primary Examiner

U.S. Cl. X.R.

161—160